(12) United States Patent
Rener (10) Patent No.: US 12,546,592 B2
(45) Date of Patent: Feb. 10, 2026

(54) SYSTEM AND METHOD FOR CALIBRATING A SENSOR

(71) Applicant: Robert Bosch GmbH, Stuttgart (DE)

(72) Inventor: Jacob Lee Rener, Livonia, MI (US)

(73) Assignee: Robert Bosch GmbH, Stuttgart (DE)

( * ) Notice: Subject to any disclaimer, the term of this patent is extended or adjusted under 35 U.S.C. 154(b) by 501 days.

(21) Appl. No.: 18/155,346

(22) Filed: Jan. 17, 2023

(65) Prior Publication Data

US 2024/0240938 A1    Jul. 18, 2024

(51) Int. Cl.
| | | |
|---|---|---|
| *G01B 21/22* | (2006.01) | |
| *B62D 15/02* | (2006.01) | |
| *G01D 18/00* | (2006.01) | |
| *G01S 13/86* | (2006.01) | |

(52) U.S. Cl.
CPC .......... *G01B 21/22* (2013.01); *B62D 15/027* (2013.01); *G01D 18/008* (2013.01)

(58) Field of Classification Search
CPC .... G01B 21/22; G01B 11/272; B62D 15/027; B62D 15/0245; B62D 15/021; G01D 18/008; G01S 7/4021; G01S 17/86; G01S 7/497; G01S 7/5205; G01S 17/42; G01S 17/89; G01S 7/52004; B60W 30/09; B60W 40/114; B60W 40/00; B60W 60/0018; G06T 7/73; G06T 7/85; G06T 7/80; G06T 7/70; B60D 1/36; B60G 17/019; G05D 1/0094

USPC ........................................................ 73/1.79
See application file for complete search history.

(56) References Cited

U.S. PATENT DOCUMENTS

| | | | |
|---|---|---|---|
| 7,325,322 B2 | 2/2008 | Fulks et al. | |
| 10,077,045 B2 | 9/2018 | Kiyokawa et al. | |
| 10,766,484 B2 | 9/2020 | Bae et al. | |
| 10,884,125 B2 | 1/2021 | Harase et al. | |
| 2010/0066515 A1 | 3/2010 | Shimazaki et al. | |
| 2016/0209211 A1* | 7/2016 | Song | G01S 7/4972 |
| 2019/0161118 A1 | 5/2019 | Greenwood | |

* cited by examiner

*Primary Examiner* — Brandi N Hopkins
(74) *Attorney, Agent, or Firm* — Michael Best & Friedrich LLP (57) ABSTRACT

A sensor calibration system for a vehicle including a first sensor positioned at a reference angle, the first sensor senses an object, a second sensor disposed within the first sensor, the second sensor senses a first angle of the first sensor, and an electronic processor. The electronic processor receives vehicle movement information, determines, based on the vehicle movement information, whether the vehicle is stopped, and in response to determining that the vehicle is stopped, obtains a first signal indicative of the first angle from the second sensor. The electronic processor also converts the first angle to a second angle, determines whether the second angle is within a tolerance range, in response to determining that the second angle is within the tolerance range, modifies a calibration of the first sensor using the second angle, and senses the object using the modified calibration of the first sensor.

20 Claims, 5 Drawing Sheets

SYSTEM AND METHOD FOR CALIBRATING A SENSOR

BACKGROUND

Embodiments, examples, and aspects herein relate to, among other things, a system and method for calibrating a sensor of a vehicle.

SUMMARY

Some existing vehicles include various sensors for sensing objects located in a peripheral environment of the vehicle. In some instances, the various sensors are used to sense the presence of objects, the movement of objects, or a distance from the objects to the vehicle. The sensors are often positioned at a specific location and at a specific angle on the fascia of the vehicle, when the vehicle is manufactured, to facilitate accurate sensing of objects. The inventor has learned that in some instances, it is difficult to maintain the specific location and the specific angle of the sensors throughout normal operation of the vehicle. In such instances, if the specific location or the specific angle of the sensors deviate from an expected or desired position, the information provided by the sensor impacts performance of the vehicle.

Examples described herein provide, among other things, a system and method for calibrating a sensor of a vehicle.

One example provides a sensor calibration system for a vehicle. The sensor calibration system includes a first sensor positioned at a reference angle. The first sensor senses an object. A second sensor is disposed within the first sensor. The second sensor senses a first angle of the first sensor. An electronic processor is connected to (or in communication with) the first sensor and the second sensor. The electronic processor receives vehicle movement information and determines, based on the vehicle movement information, whether the vehicle is stopped. In response to determining that the vehicle is stopped, the electronic processor, in some examples, obtains a first signal indicative of the first angle from the second sensor, converts the first angle to a second angle, and determines whether the second angle is within a tolerance range. In response to determining that the second angle is within the tolerance range, the electronic processor modifies a calibration of the first sensor using the second angle, and senses the object using the modified calibration of the first sensor.

In some instances, the electronic processor, in response to determining that the second angle is not within the tolerance range, determines a fault condition.

In some instances, the reference angle is established when the vehicle is unloaded.

In some instances, the first angle comprises a deviation from the reference angle.

In some instances, the electronic processor set the second angle as the reference angle.

In some instances, the electronic processor receives a second signal from the first sensor, determines, based on the second signal, a height of the first sensor, receives a third signal from the first sensor, and determines, based on the third signal and the second angle, a distance to the object.

In some instances, the electronic processor determines, based on the second angle and the height, a distance from the first sensor to the ground and determines, based on the distance from the first sensor to the ground, a field of view (FOV) of the first sensor.

In some instances, the electronic processor determines, based on the FOV and the distance to the object, whether the object is outside the FOV and in response to determining that the object is outside the FOV, determines a false positive.

In some instances, the electronic processor sets, based on the second angle and the height, a sensitivity of the first sensor.

In some instances, the sensor calibration system also includes a vehicle control system that provides the vehicle movement information to the electronic processor.

Another example provides a method for calibrating a sensor of a vehicle. The method includes receiving vehicle movement information, positioning a first sensor at a reference angle, sensing, via a first sensor, an object, and sensing, via a second sensor, a first angle of the first sensor. The second sensor is disposed within the first sensor. The method also includes determining, via an electronic processor and based on the vehicle movement information, whether the vehicle is stopped. In response to determining that the vehicle is stopped, a first signal indicative of the first angle is obtained from the second sensor. The method also includes converting, via the electronic processor, the first angle to a second angle, determining, via the electronic processor, whether the second angle is within a tolerance range, and, in response to determining that the second angle is within the tolerance range, modifying, via the electronic processor, a calibration of the first sensor using the second angle. The method also includes sensing, via the first sensor, the object using the modified calibration of the first sensor.

Other features, aspects, and benefits of various examples will become apparent by consideration of the detailed description and accompanying drawings.

DETAILED DESCRIPTION

One or more examples are described and illustrated in the following description and accompanying drawings. These examples are not limited to the specific details provided herein and may be modified in various ways. Other examples may exist that are not described herein. For example, a device or structure that is "configured" in a certain way is configured in at least that way but may also be configured in ways that are not listed.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the aspects may be implemented in software (for example, stored on non-transitory computer-readable medium) executable by one or more processors. Thus, a plurality of hardware and software based devices, as well as a plurality of different structural components may be utilized to implement various aspects and examples. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. Unless the context clearly indicates otherwise, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Examples described herein may be implemented via a non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections.

Unless the context of their usage unambiguously indicates otherwise, the articles "a" and "an" should not be interpreted as meaning "one" or "only one." Rather these articles should be interpreted as meaning "at least one" or "one or more."

Relational terms, for example, first and second, top and bottom, and the like may be used herein solely to distinguish one entity or action from another entity or action without necessarily requiring or implying any actual such relationship or order between such entities or actions.

In some examples, method steps are conducted in an order that is different from the order described.

Figure 1:
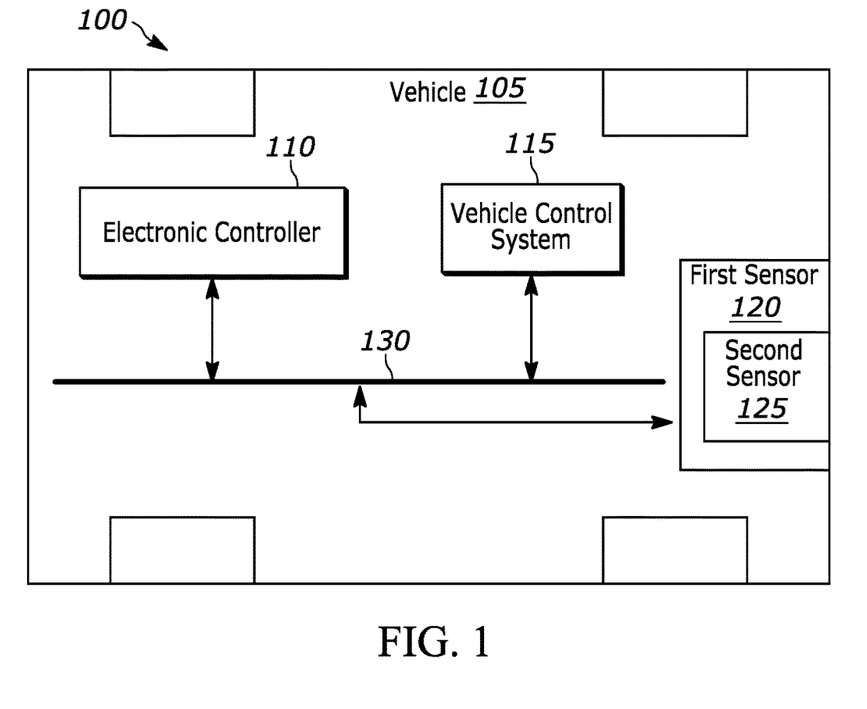
FIG. 1 is a block diagram of a sensor calibration system for a vehicle, according to some examples.

FIG. 1 illustrates a sensor calibration system 100 for a vehicle 105. In the illustrated example, the sensor calibration system 100 includes an electronic controller 110, a vehicle control system 115, a first sensor 120, and a second sensor 125. The components of the sensor calibration system 100, along with other various modules and components are electrically and communicatively coupled to each other via direct connections or by or through one or more control or data buses (for example, a bus 130), which enable communication therebetween. The use of control and data buses for the interconnection between, and communication among, the various modules and components would be known to a person skilled in the art in view of the invention described herein. In some instances, the bus 130 is a Controller Area Network (CAN™) bus. In some instances, the bus 130 is an automotive Ethernet™, a FlexRay™ communications bus, or another suitable bus. In alternative instances, some or all of the components of the sensor calibration system 100 may be communicatively coupled using suitable wireless modalities (for example, Bluetooth™ or near field communication connections). The vehicle 105 is illustrated as a four-wheeled vehicle, but aspects, features, and embodiments described may be applied to other types and designs of wheeled vehicles.

The electronic controller 110 (described in greater detail below with respect to FIG. 2) communicates with the vehicle control system 115, the first sensor 120, and the second sensor 125. The electronic controller 110 may receive sensor data from the first sensor 120 and the second sensor 125 and transmit control commands to modify a calibration of the first sensor 120. The electronic controller 110 transmits the control commands to, among other things, the first sensor 120 to adapt or change a characteristic of the first sensor 120. In some instances, the electronic controller 110 is part of one or more vehicle controllers that implement control of the vehicle 105.

The vehicle control system 115 may include controllers, actuators, and the like for controlling operation of the vehicle 105 (for example, acceleration, braking, steering, shifting gears, and the like). The vehicle control system 115 communicates with the electronic controller 110 via the bus 130. In some instances, the vehicle control system 115 provides vehicle movement information (for example, acceleration information, braking information, vehicle wheel rotation information, and the like) to the electronic controller 110.

The first sensor 120 senses an object in a surrounding environment of the vehicle 105 and communicates information regarding the object to the electronic controller 110 using, for example, messages transmitted on the bus 130. In some examples, the first sensor 120 is positioned at a reference angle (described in greater detail below with respect to FIG. 4A) within the vehicle 105. The first sensor 120 is, in some examples, an ultrasonic sensor. The second sensor 125 senses a first angle of the first sensor 120 (illustrated in FIG. 4B as a first angle 410). In some examples, the second sensor 125 is disposed within the first sensor 120 and a tilt sensor implanted using an accelerometer. In some instances, the first sensor 120 reads or receives data from the second sensor 125 and includes an electronic processor to process sensor data before outputting sensor information to other components of the vehicle 105, for example the electronic controller 110.

Figure 2:
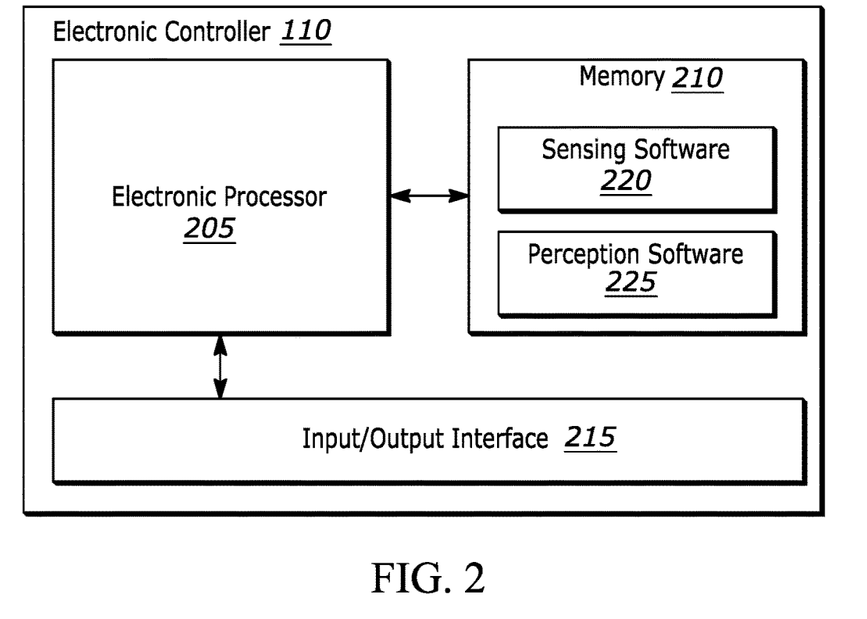
FIG. 2 is a block diagram of an electronic controller of the sensor calibration system of FIG. 1, according to some examples.

FIG. 2 is a block diagram of the electronic controller 110 of the sensor calibration system 100 of FIG. 1. The electronic controller 110 includes, among other things, an electronic processor 205 (such as a programmable electronic microprocessor, microcontroller, or similar device), a memory 210 (for example, a non-transitory, machine readable medium), and an input/output interface 215. The electronic processor 205 is electronically connected to the memory 210 and the input/output interface 215. The electronic processor 205 sends and receives information (for example, from the memory 210 and/or the input/output interface 215) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, software for performing methods as described herein. In the example illustrated, the memory 210 stores, among other things, a sensing software 220 for storing information associated with angles and sensor data of the first sensor 120. The memory 210 also stores a perception software 225 for storing information associated with the object sensed by the first sensor 120. The input/output interface 215 transmits and receives information from devices external to the electronic processor 205 (for example, components of the vehicle 105 via the bus 130).

Figure 3A:
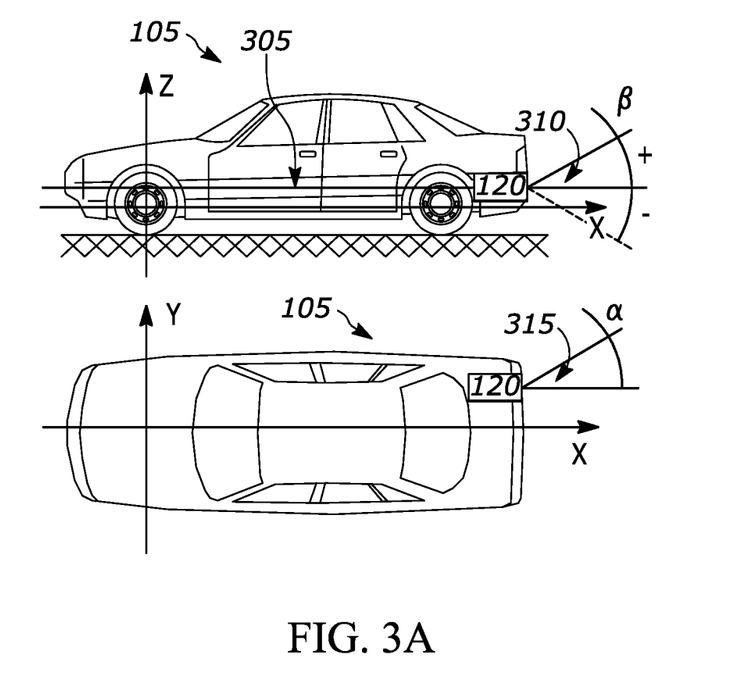
FIG. 3A illustrates a coordinate system of a vehicle including a sensor, according to some examples.

FIG. 3A illustrates a coordinate system of the vehicle 105 including the first sensor 120. In some instances, during manufacturing of the vehicle 105, the first sensor 120 is positioned at a location on the vehicle 105 defined by the coordinate system. The coordinate system includes a x-coordinate designated by an X axis, a y-coordinate designated by a Y axis, and a z-coordinate designated by a Z axis. For example, an origin of the coordinate system can be located along an axle of a front wheel of the vehicle 105. In some examples, the location of the first sensor 120 relative to the X axis corresponds to a longitudinal coordinate of the first sensor 120 along a length of the vehicle 105. In some examples, the location of the first sensor 120 relative to the Y axis corresponds to a lateral coordinate of the first sensor 120 along a width of the vehicle 105. In some examples, the location of the first sensor 120 relative to the Z axis corresponds to a vertical coordinate along a height of the vehicle 105. For example, the first sensor 120 is positioned at a height of the vehicle 105 along a sensor axis 305 that is parallel to the X axis. Furthermore, the first sensor 120 senses a beta angle 310 and an alpha angle 315 based on the location of the first sensor 120 along the sensor axis 305. The beta angle 310 corresponds to a vertical angular direction or orientation of the first sensor 120 relative to the X axis. The alpha angle 315 corresponds to a horizontal angular direction or orientation of the first sensor 120 relative to the Y axis. In some instances, the longitudinal coordinate, the lateral coordinate, the vertical coordinate, the beta angle 310, and the alpha angle 315 are predetermined values and stored in the memory 210. In other instances, the first sensor 120 may transmit the longitudinal coordinate, the lateral coordinate, the vertical coordinate, the beta angle 310, and the alpha angle 315 to the electronic processor 205 for storage in the memory 210.

Based on the height of the first sensor 120 along the sensor axis 305 and the beta angle 310, the electronic processor 205 determines the location of the first sensor 120 on the vehicle 105. In some examples, the electronic processor 205 performs a calibration of the first sensor 120 based on the location of the first sensor 120. For example, the electronic processor 205 saves the longitudinal coordinate, the lateral coordinate, the vertical coordinate, the beta angle 310, and the alpha angle 315 to the memory 210 as known values of the first sensor 120. In some examples, the calibration of the first sensor 120 represents the beta angle 310 set at a zero degree angle about the sensor axis 305 (described in greater detail below with respect to FIG. 4A). In some examples, if the location of the first sensor 120 deviates from the calibration during operation of the vehicle 105, the performance of the first sensor 120 is affected. For example, when there is a deviation in the beta angle 310 or the alpha angle 315 of the first sensor 120 relative to the calibration, the first sensor 120 incorrectly senses the object in the surrounding environment of the vehicle 105. In some examples, a deviation in the beta angle 310 or the alpha angle 315 is caused by a deviation during installation of the first sensor 120 on the vehicle 105, a load placed on or in the vehicle 105, damage to the vehicle 105, and another cause.

Figure 3B:
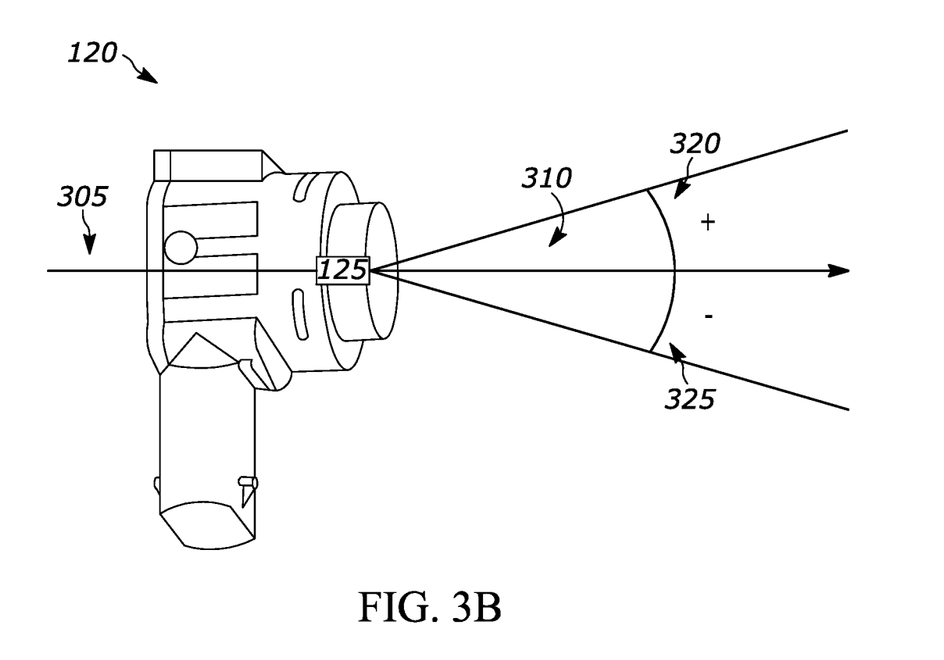
FIG. 3B illustrates the sensor and an angle of the sensor of FIG. 3A, according to some examples.

FIG. 3B illustrates the first sensor 120 of FIG. 3A. In this example, the first sensor 120 includes the second sensor 125. As described above, the second sensor 125 senses the first angle of the first sensor 120. In some examples, the first angle corresponds to the beta angle 310 of the first sensor 120. Likewise, when a deviation from the position of the first sensor 120 along the sensor axis 305 occurs, the second sensor 125 senses a deviation in the beta angle 310 as the first angle relative to the angle set during calibration of the first sensor 120. For example, the second sensor 125 senses the first angle as a deviation from the zero degree angle along the sensor axis 305 set during calibration. In some instances, the first angle is based on a change in the longitudinal coordinate and a change in the lateral coordinate based on the deviation from the calibration angle. In some examples, the first angle may be a positive beta angle 320 relative to the calibration angle of the first sensor 120. In other examples, the first angle may be a negative beta angle 325 relative to the calibration angle of the first sensor 120.

Figure 4A:
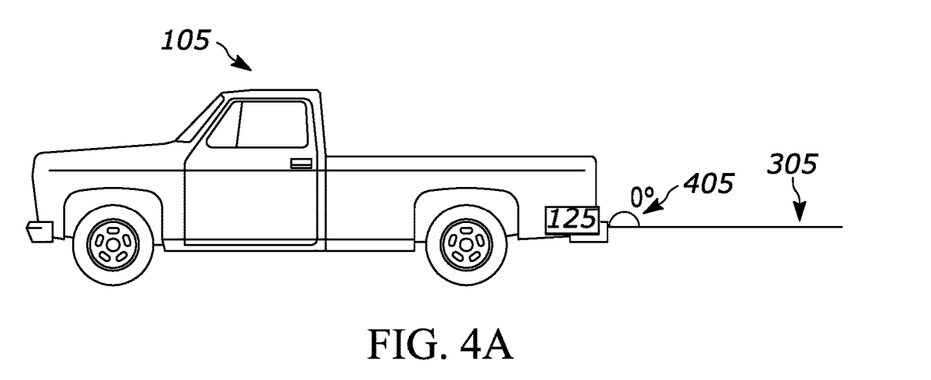
FIG. 4A illustrates the vehicle and the sensor of FIG. 3B at a reference angle, according to some examples.
Figure 4B:
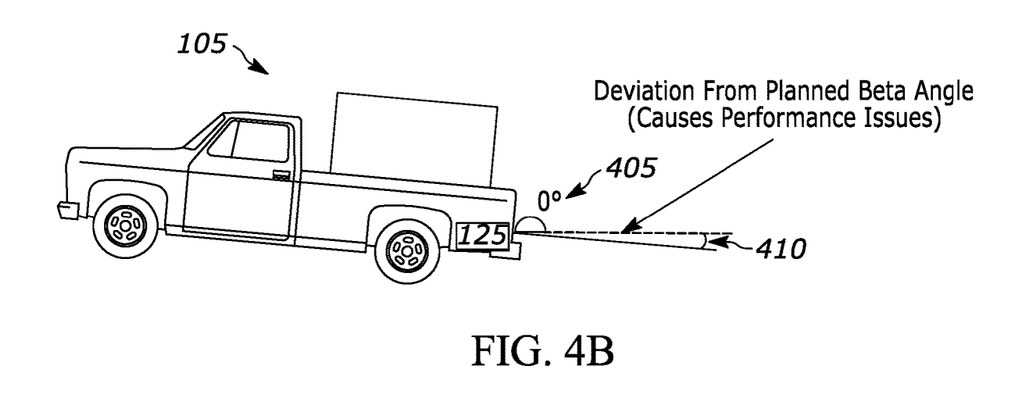
FIG. 4B illustrates the vehicle and the sensor of FIG. 4A at a deviation from the reference angle, according to some examples.

FIG. 4A illustrates the vehicle 105 and the second sensor 125 of FIG. 3B. The second sensor 125 is positioned along the sensor axis 305 at a reference angle 405. The reference angle 405 corresponds to the beta angle 310 of the first sensor 120 saved in the memory 210 from the calibration. For example, the reference angle 405 is the zero degree angle set at the calibration. In some examples, the reference angle 405 is established when the vehicle 105 is unloaded. When the vehicle 105 is unloaded, the second sensor 125 senses no deviation in the beta angle 310 from the calibration (e.g., the zero degree angle). FIG. 4B illustrates the vehicle 105 and the second sensor 125 of FIG. 4A. The second sensor 125 changes position based on a deviation from the position of the first sensor 120 from the sensor axis 305 (e.g., a deviation caused by a load placed within the vehicle 105). For example, when a deviation in the position of the first sensor 120 from the sensor axis 305 occurs, the second sensor 125 senses the first angle (illustrated in FIG. 4B as a first angle 410) including a deviation from the reference angle 405 (e.g., the second sensor 125 senses the first angle as a deviation in the beta angle 310 from the calibration).

Figure 5:
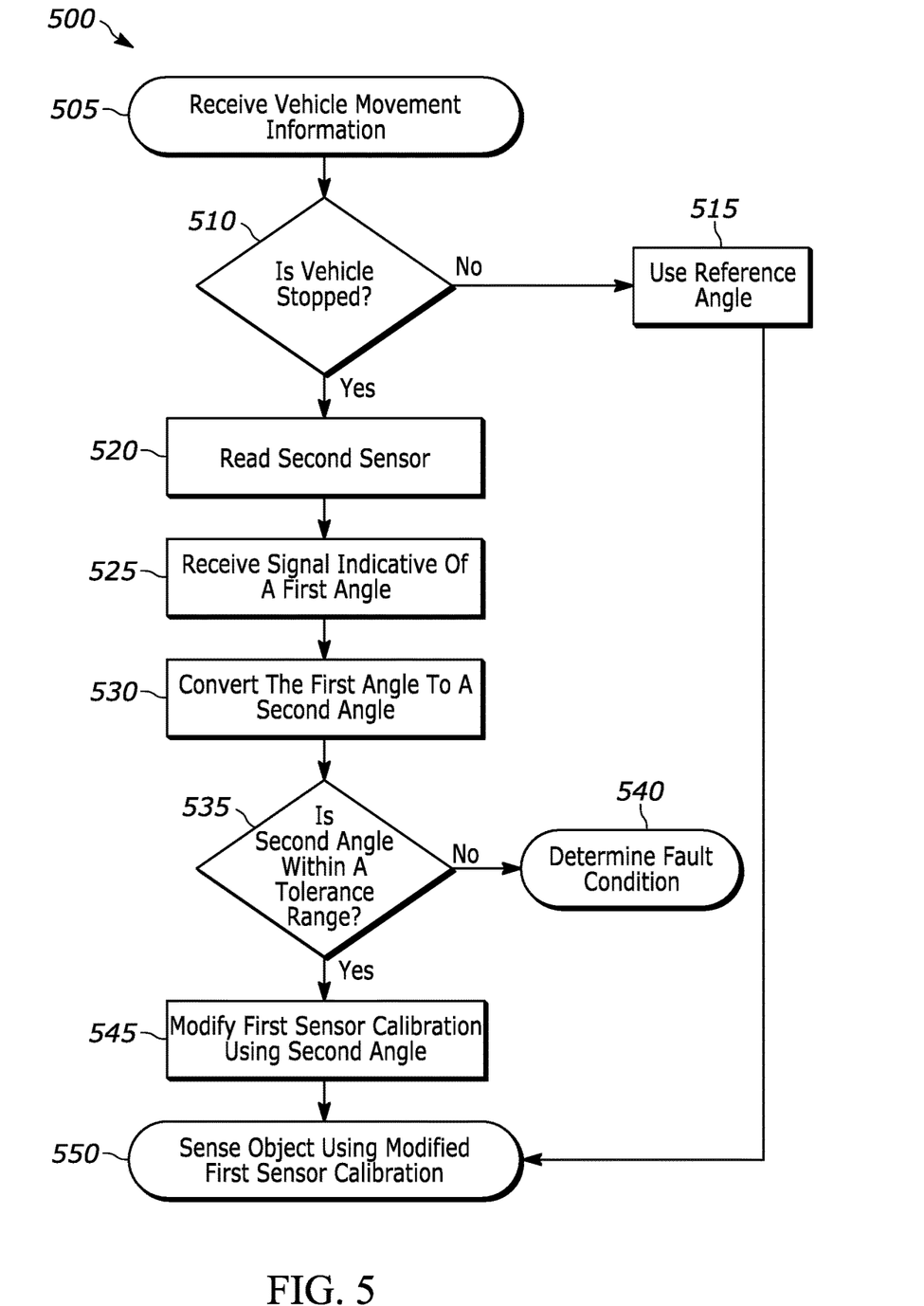
FIG. 5 illustrates a flowchart of a method for calibrating a sensor of a vehicle, according to some examples.

FIG. 5 illustrates a flowchart of an example method 500 for calibrating the first sensor 120 of the vehicle 105. The method 500 is described as being executed by the electronic processor 205. However, in some examples, aspects of the method 500 are performed by another device. For example, aspects of the method 500 may be performed by the first sensor 120 in conjunction with the electronic processor 205. Additionally, while a particular order is provided, in some examples, the steps of the method 500 may be performed in a different order.

At step 505, the electronic processor 205 receives vehicle movement information. For example, the electronic processor 205 receives the vehicle movement information of the vehicle 105 from the vehicle control system 115. At step 510, the electronic processor 205 determines whether the vehicle 105 is stopped based on the vehicle movement information. For example, the vehicle control system 115 provides braking information to the electronic processor 205 and the electronic processor 205 determines, based on the braking information, whether the vehicle 105 has come to a stop. When the electronic processor 205 determines that the vehicle 105 is not stopped, the method 500 proceeds to step 515. When the electronic processor 205 determines that the vehicle 105 is stopped, the method 500 proceeds to step 520.

At step 515, the electronic processor 205 uses the reference angle 405 determined from a previous calibration of the first sensor 120 to perform calculations. The method 500 proceeds to step 550.

At step 550, the electronic processor 205 senses the object using the reference angle 405. For example, the electronic processor 205 executes the perception software 225 to sense the object in the surrounding environment of the vehicle 105 using the reference angle 405 of the first sensor 120. It should be understood, that in some examples, the method 500 continues to use the reference angle 405 of the first sensor 120 to perform calculations until a future calibration occurs. A future calibration may occur, for example, when the vehicle 105 comes to a stop.

At step 520, the electronic processor 205 reads the second sensor 125. For example, in response to determining that the vehicle 105 is stopped, the electronic processor 205 provides a command to the first sensor 120 to read the second sensor 125. The second sensor 125 may continuously sense the longitudinal coordinate and the lateral coordinate indicative of the beta angle 310 of the first sensor 120.

At step 525, the electronic processor 205 receives a first signal indicative of the first angle 410 from the second sensor 125. For example, the electronic processor 205 receives the first signal including the sensed longitudinal coordinate and lateral coordinate from the second sensor 125 via the first sensor 120. In some examples, the electronic processor 205 reading the second sensor 125 and receiving the first signal from the second sensor 125 is equivalent to the electronic processor 205 obtaining the first signal from the second sensor 125. When a deviation from the calibration occurs, the first signal indicates the first angle 410 as a deviation from the reference angle 405.

At step 530, the electronic processor 205 converts the first angle 410 to a second angle. For example, the electronic processor 205 executes the sensing software 220 to convert the sensed longitudinal coordinate and lateral coordinate (e.g., the first angle 410) to the second angle. In some examples, the electronic processor 205 converts the first angle 410 to the second angle via Equation 1 and Equation 2.

$$\theta_{rad} = \arctan\left(\frac{-a_x}{\sqrt{a_y^2 + a_z^2}}\right) \quad \text{Equation 1}$$

$$\theta_{deg} = \theta_{rad} * \frac{180}{\pi} \quad \text{Equation 2}$$

Where $\theta_{rad}$ is the second angle in radians, $\alpha_x$ is the sensed longitudinal coordinate, $\alpha_y$ is the sensed lateral coordinate, $\alpha_z$ is the sensed vertical coordinate, and $\theta_{deg}$ is the second angle in degrees.

At step 535, the electronic processor 205 determines whether the second angle is within a tolerance range. For example, the electronic processor 205 determines whether the second angle is within a tolerance range of the reference angle 405. In some instances, the tolerance range is approximately a 45 degree difference from the reference angle 405. For example, if the reference angle 405 is approximately 0 degrees, the tolerance range is within a range of between approximately −45 degrees and approximately 45 degrees relative to the reference angle 405. When the electronic processor 205 determines that the second angle is not within the tolerance range, the method 500 proceeds to step 540. At step 540, the electronic processor 205 determines a fault condition. For example, the electronic processor 205 determines that the first sensor 120 is broken, misaligned, or the like based on the fault condition. When the electronic processor 205 determines that the second angle is within the tolerance range, the method 500 proceeds to step 545.

At step 545, the electronic processor 205 modifies the calibration of the first sensor 120 using the second angle. For example, in response to determining that the second angle is within the tolerance range, the electronic processor 205 sets the second angle as the reference angle 405.

At step 550, the electronic processor 205 senses the object using the modified calibration of the first sensor 120. For example, the electronic processor 205 executes the perception software 225 to sense the object in the surrounding environment of the vehicle 105 using the modified calibration of the first sensor 120. It should be understood, that in some examples, the method 500 may continue to modify the calibration of the first sensor 120 when the electronic processor 205 receives additional vehicle movement information indicating that the vehicle 105 has come to a subsequent stop.

Figure 6:
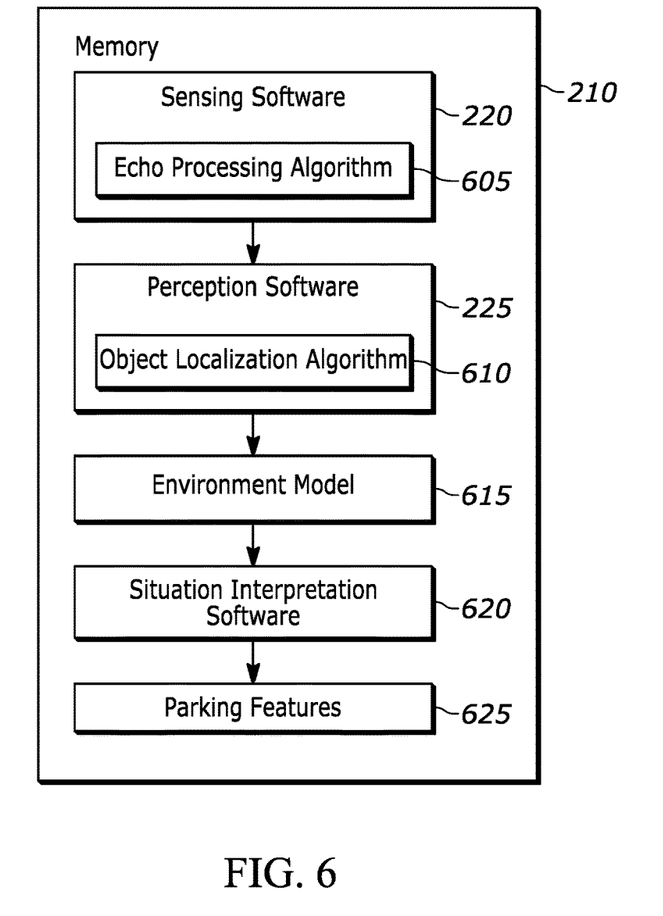
FIG. 6 is a block diagram of a memory of the electronic controller of FIG. 2, according to some examples.

FIG. 6 illustrates an example of the memory 210 of the electronic controller 110 of FIG. 2. In the example shown, the memory 210 includes the sensing software 220 and the perception software 225. The sensing software 220 may include an echo processing algorithm 605. The echo processing algorithm 605 is implemented by the electronic processor 205 to analyze the reference angle 405 (for example, based on the modified calibration of the first sensor 120) and, among other things, determine characteristics of the first sensor 120. In some examples, the characteristics of the first sensor 120 include a distance from the first sensor 120 to the ground, a height significance of the first sensor 120, and the like. Accordingly, the echo processing algorithm 605 (implemented by the electronic processor 205) receives the first signal, including the reference angle 405, from the second sensor 125 and determines a height of the first sensor 120, based on the vertical coordinate of the first sensor 120 stored in the memory 210, and outputs information relating to the analyzed reference angle 405. For example, based on the reference angle 405 and the height of the first sensor 120, the echo processing algorithm 605 may determine a minimum distance from the first sensor 120 to the ground defining a field of view (FOV) (described in greater detail below with respect to FIG. 7) of the first sensor 120. The echo processing algorithm 605 uses the minimum distance from the first sensor 120 to the ground to eliminate false echoes from the first sensor 120 indicative of the first sensor 120 sensing the ground instead of the object. In another example, based on the reference angle 405 and the height of the first sensor 120, the echo processing algorithm 605 may determine a clutter compensation value of the first sensor 120. The echo processing algorithm 605 uses the clutter compensation value to determine the height significance of the first sensor 120. Based on the height significance, the echo processing algorithm 605 filters out false positives (e.g., the first sensor 120 sensing the ground instead of the object) based on false echoes provided by the first sensor 120.

The perception software 225 may include an object localization algorithm 610. The object localization algorithm 610 is implemented by the electronic processor 205 to analyze the object (for example, the object sensed by the first sensor 120), and, among other things, determine the object. The object localization algorithm 610 (implemented by the electronic processor 205) receives a signal from the echo processing algorithm 605 indicating that the first sensor 120 senses the object and outputs information relating to the analyzed object. For example, based on the modified calibration of the first sensor 120 and the FOV of the first sensor 120, a minimum distance that the first sensor 120 can sense the object. The object localization algorithm 610 uses the minimum distance that the first sensor 120 can sense the object to determine a position of the object. Based on the position of the object, the object localization algorithm 610 may determine that the object is outside the FOV of the first sensor 120. In another example, when the object localization algorithm 610 determines that the object is within the FOV of the first sensor 120, the object localization algorithm 610 determines the object based on the modified calibration and the height of the first sensor 120. In some examples, the memory 210 includes an environment model 615. The environment model 615 is implemented by the electronic processor 205 to model the surrounding environment of the vehicle 105 including the object sensed by the first sensor 120. In some examples, the environment model 615 receives one or more signals from additional sensors (e.g., ultrasonic sensors, video sensors, radar sensors, external sensors, etc.) and determines a vehicle odometry (e.g., a change in a position of the vehicle over time) and a vehicle status. In some examples, the environment model 615 receives a signal from the object localization algorithm 610 indicating a determined object. Based on the determined object, the environment model 615 is updated to include a location of the determined object. In some instances, the environment model 615 is updated to include any number of determined objects based on signals received from the object localization algorithm 610. In some examples, the electronic processor 205 references the environment model 615 when performing a parking function (e.g., backing up the vehicle 105 into a parking spot, pulling in the vehicle 105 to a parking spot, determining a relative location of the determined object, etc.). In such examples, the electronic processor 205 references the vehicle odometry to track the determined object when the determined object is outside the FOV of the first sensor 120.

In some examples, the memory 210 includes situation interpretation software 620. The situation interpretation software 620 is implemented by the electronic processor 205 to interpret the environment model 615 or a situation (e.g., maneuvering the vehicle 105 around the determined object while parking) that the vehicle 105 is in and perform parking features 625 of the vehicle 105. For example, the environment model 615 is implemented by the situation interpretation software 620 to determine parking spaces and when the vehicle 105 is in an appropriate position to maneuver into a parking space. In some examples, the status of the vehicle 105 and the environment model 615 are implemented by the situation interpretation software 620 to determine if a collision is going to occur and if the vehicle 105 should apply emergency braking, via the vehicle control system 115, to prevent a collision from occurring. In some situations, the situation interpretation software 620 implements the environment model 615 to determine the status of the vehicle 105 (e.g., when the vehicle 105 is currently parking, when the vehicle 105 is driving on the road, an orientation of the street that the vehicle 105 is driving on, etc.). In some examples, the electronic processor 205 references the environment model 615 and the situation interpretation software 620 to perform the parking features 625 (e.g., a parking assist, autonomous parking, emergency braking, etc.) based on the location of the determined object. For example, when performing a parking assist, the electronic processor 205 provides an alert based on determined objects by the situation interpretation software 620. In other examples, when performing autonomous parking, the electronic processor 205 transmits a parking command to the vehicle control system 115 to maneuver the vehicle 105 to park in a determined parking spot. In other examples, when performing emergency braking, the electronic processor 205 transmits a braking command to the vehicle control system 115 to brake the vehicle 105 for an object that the electronic processor 205 determines will be hit at a current vehicle speed and a current vehicle orientation.

Figure 7:
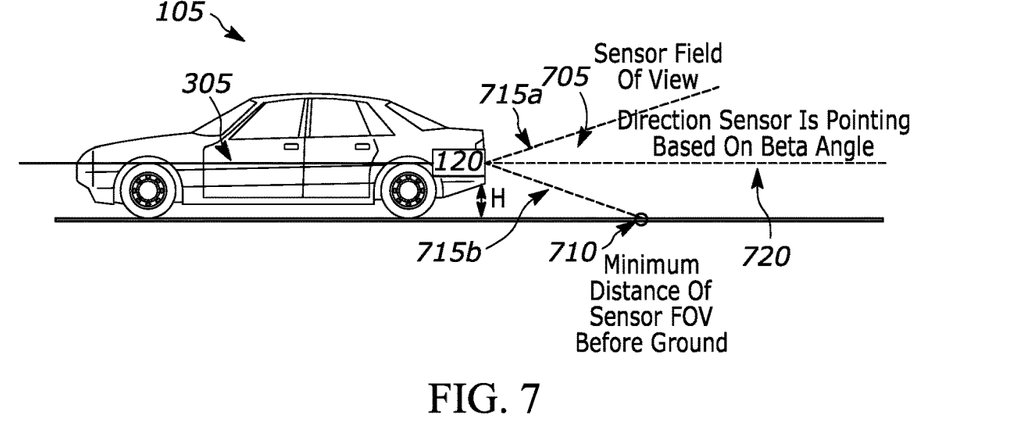
FIG. 7 illustrates a field of view of a sensor disposed within a vehicle, according to some examples.

FIG. 7 illustrates a field of view (FOV) 705 of the first sensor 120. In some examples, the FOV 705 is a physical field of view of the first sensor 120 in which the first sensor 120 senses an object. In some examples, the FOV 705 includes a horizontal component (e.g., a range of the FOV 705 along the Y axis relative to the location of the first sensor 120 along the X axis) and a vertical component (e.g., a range of the FOV 705 along the Z axis relative to the location of the first sensor 120 along the X axis). In some instances, the horizontal component and the vertical component are predetermined. In some examples, the electronic processor 205 receives a second signal from the first sensor 120 indicative of a height H of the first sensor 120. Based on the second signal and the vertical coordinate of the first sensor 120 stored in the memory 210, the electronic processor 205 determines the height H of the first sensor 120. For example, the height H of the first sensor 120 is a height of the first sensor 120 from the ground to the position of the first sensor 120 along the sensor axis 305. In some examples, the electronic processor 205 receives a third signal from the first sensor 120 indicative of the object. Based on the third signal and the modified calibration of the first sensor 120, the electronic processor 205 executes the object localization algorithm 610 to determine a distance to the object. In some examples, based on the modified calibration and the height H, the electronic processor 205 executes the echo processing algorithm 605 to determine a distance 710 from the first sensor 120 to the ground. Based on the distance 710, the electronic processor 205 executes the echo processing algorithm 605 to determine the FOV 705 of the first sensor 120. The FOV 705 may be defined by line 715*a* and line 715*b*. In some examples, the FOV 705 is centered about line 720. For example, line 720 is a direction that the first sensor 120 is pointing based on the modified calibration. In some instances, the electronic processor 205 executes the object localization algorithm 610 to determine the object within line 715*a* and line 715*b*. In some instances, the electronic processor 205 executes the object localization algorithm 610 to determine that the object is outside of the FOV 705 based on the line 720.

In some examples, based on the FOV 705 and the distance 710 from the first sensor 120 to the object, the electronic processor 205 executes the object localization algorithm 610, as described above with respect to FIG. 6, to determine whether the object is outside the FOV 705. In response to determining that the object is outside the FOV 705, the electronic processor 205 determines that the object is a false positive (e.g., a false echo provided by the first sensor 120). In some examples, the electronic processor 205 sets a sensitivity of the first sensor 120 based on the modified calibration and the height H. The electronic processor 205 may use the sensitivity of the first sensor 120 to distinguish between objects or set a limit for determining objects. For example, if the vehicle 105 reverses into a pile of leaves, any signal provided by the first sensor 120 will be noisy due to the varying object sensed by the first sensor 120. The sensitivity set by the electronic processor 205 limits how sensitive the first sensor 120 is when sensing the object.

Thus, examples provide, among other things, a system and method for calibrating a sensor of a vehicle. Various features, advantages, and examples are set forth in the following claims.

What is claimed is:

1. A sensor calibration system for a vehicle, the system comprising:
   a first sensor positioned at a reference angle, the first sensor configured to sense an object;
   a second sensor disposed within the first sensor, the second sensor configured to sense a first angle of the first sensor; and
   an electronic processor in communication with the first sensor and the second sensor and configured to:
   receive vehicle movement information;
   determine, based on the vehicle movement information, whether the vehicle is stopped;
      in response to determining that the vehicle is stopped, obtain a first signal indicative of the first angle from the second sensor;
      convert the first angle to a second angle;
      determine whether the second angle is within a tolerance range;
      in response to determining that the second angle is within the tolerance range,
   modify a calibration of the first sensor using the second angle; and
      sense the object using the modified calibration of the first sensor.

2. The sensor calibration system of claim 1, wherein the electronic processor is configured to:
   in response to determining that the second angle is not within the tolerance range, determine a fault condition.

3. The sensor calibration system of claim 1, wherein the reference angle is established when the vehicle is unloaded.

4. The sensor calibration system of claim 1, wherein the first angle comprises a deviation from the reference angle.

5. The sensor calibration system of claim 1, wherein the electronic processor is configured to set the second angle as the reference angle.

6. The sensor calibration system of claim 1, wherein the electronic processor is configured to:
   receive a second signal from the first sensor;
   determine, based on the second signal, a height of the first sensor;
receive a third signal from the first sensor; and
determine, based on the third signal and the second angle, a distance to the object.

7. The sensor calibration system of claim 6, wherein the electronic processor is configured to:
   determine, based on the second angle and the height, a distance from the first sensor to the ground; and
   determine, based on the distance from the first sensor to the ground, a field of view (FOV) of the first sensor.

8. The sensor calibration system of claim 7, wherein the electronic processor is configured to:
   determine, based on the FOV and the distance to the object, whether the object is outside the FOV; and
   in response to determining that the object is outside the FOV, determine a false positive.

9. The sensor calibration system of claim 7, wherein the electronic processor is configured to:
   set, based on the second angle and the height, a sensitivity of the first sensor.

10. The sensor calibration system of claim 1, the system comprising:
    a vehicle control system configured to provide the vehicle movement information to the electronic processor.

11. A method for calibrating a sensor of a vehicle, the method comprising:
    receiving vehicle movement information;
    positioning a first sensor at a reference angle;
    sensing, via a first sensor, an object;
    sensing, via a second sensor, a first angle of the first sensor, wherein the second sensor is disposed within the first sensor;
    determining, via an electronic processor and based on the vehicle movement information, whether the vehicle is stopped;
    in response to determining that the vehicle is stopped, obtaining a first signal indicative of the first angle from the second sensor;
    converting, via the electronic processor, the first angle to a second angle;
    determining, via the electronic processor, whether the second angle is within a tolerance range;
    in response to determining that the second angle is within the tolerance range, modifying, via the electronic processor, a calibration of the first sensor using the second angle; and
    sensing, via the first sensor, the object using the modified calibration of the first sensor.

12. The method of claim 11, wherein the method comprises:
    in response to determining that the second angle is not within the tolerance range, determining, via the electronic processor, a fault condition.

13. The method of claim 11, wherein the reference angle is positioned when the vehicle is unloaded.

14. The method of claim 11, wherein the first angle comprises a deviation from the reference angle.

15. The method of claim 11, wherein the method comprises:
setting, via the electronic processor, the second angle as the reference angle.

16. The method of claim 11, wherein the method comprises:
receiving a second signal from the first sensor;
determining, via the electronic processor and based on the second signal, a height of the first sensor;
receiving a third signal from the first sensor; and
determining, via the electronic processor and based on the third signal and the second angle, a distance to the object.

17. The method of claim 16, wherein the method comprises:
determining, via the electronic processor and based on the second angle and the height, a distance from the first sensor to the ground; and
determining, via the electronic processor and based on the distance from the first sensor to the ground, a field of view (FOV) of the first sensor.

18. The method of claim 17, wherein the method comprises:
determining, via the electronic processor and based on the FOV and the distance to the object, whether the object is outside the FOV; and
in response to determining that the object is outside the FOV, determining, via the electronic processor, a false positive.

19. The method of claim 17, wherein the method comprises:
setting, via the electronic processor and based on the second angle and the height, a sensitivity of the first sensor.

20. The method of claim 11, wherein the method comprises:
providing, via a vehicle control system, the vehicle movement information to the electronic processor.

* * * * *